United States Patent
Masuda et al.

(10) Patent No.: US 7,398,753 B2
(45) Date of Patent: Jul. 15, 2008

(54) ENGINE WITH BUILT-IN CONTINUOUSLY VARIABLE TRANSMISSION

(75) Inventors: Tatsuya Masuda, Shizuoka-ken (JP); Yousuke Ishida, Shizuoka-ken (JP)

(73) Assignee: Yamaha Hatsudoki Kabushiki Kaisha, Shizuoka-ken (JP)

( * ) Notice: Subject to any disclaimer, the term of this patent is extended or adjusted under 35 U.S.C. 154(b) by 36 days.

(21) Appl. No.: 11/305,314

(22) Filed: Dec. 16, 2005

(65) Prior Publication Data
US 2006/0122017 A1   Jun. 8, 2006

Related U.S. Application Data

(63) Continuation of application No. PCT/JP2004/008329, filed on Jun. 14, 2004.

(30) Foreign Application Priority Data

| Jun. 16, 2003 | (JP) | ............................. 2003-170904 |
| Jun. 16, 2003 | (JP) | ............................. 2003-171342 |

(51) Int. Cl.
  *F02B 75/06* (2006.01)
(52) U.S. Cl. ................................. 123/192.2; 123/197.5
(58) Field of Classification Search .............. 123/192.2, 123/197.5, 195 AC, 198 P
See application file for complete search history.

(56) References Cited

U.S. PATENT DOCUMENTS

| 6,397,810 | B2 * | 6/2002 | Ohyama et al. | .......... 123/192.2 |
| 6,554,104 | B2 * | 4/2003 | Ohyama et al. | ............ 184/6.28 |
| 6,941,918 | B2 * | 9/2005 | Laimboeck | .............. 123/195 R |
| 6,990,942 | B2 * | 1/2006 | Takeuchi | .................. 123/192.2 |
| 7,059,208 | B2 * | 6/2006 | Ho | ................................. 74/329 |
| 7,063,063 | B2 * | 6/2006 | Morii et al. | ............. 123/198 R |
| 7,159,558 | B2 * | 1/2007 | Suzuki et al. | ............ 123/192.2 |
| 2002/0005191 | A1 * | 1/2002 | Maeda et al. | ................ 123/572 |

FOREIGN PATENT DOCUMENTS

JP   2000-018348   1/2000

* cited by examiner

*Primary Examiner*—Hai H Huynh
(74) *Attorney, Agent, or Firm*—Knobbe, Martens, Olson & Bear, LLP

(57) ABSTRACT

An engine has a built-in continuously variable transmission (CVT) interconnecting a crankshaft connected through a connecting rod to a piston and a transmission shaft to which the rotation of the crankshaft is transmitted for changing speed between both of the shafts. A driven pulley and a clutch are disposed on the transmission shaft. A balancer shaft to which the rotation of the crankshaft is transmitted and the clutch are disposed in an overlapping positional relationship with each other in the direction of the crankshaft.

20 Claims, 9 Drawing Sheets

ENGINE WITH BUILT-IN CONTINUOUSLY VARIABLE TRANSMISSION

RELATED APPLICATIONS

This application is a continuation of PCT Application No. PCT/JP2004/008329, filed on Jun. 14, 2004, which claimed the priority benefit of Japanese Application No. 2003-170904, filed on Jun. 16, 2003, and Japanese Application No. 2003-171342, filed on Jun. 16, 2003, each of which is hereby incorporated by reference in its entirety.

BACKGROUND OF THE INVENTION

1. Field of the Invention

The present invention generally relates to an engine with an integrated continuously variable transmission (CVT) that extends between a crankshaft and a transmission shaft. More particularly, the present invention relates to such a combination in which rotation of the transmission shaft is provided to a drive shaft output.

2. Description of the Related Art

An engine having an integrated continuously variable transmission is shown and described in JP-A-2000-18348. In the configuration shown in FIG. 4 of the Japanese reference, one end of a crankshaft of the engine carries a drive pulley of the continuously variable transmission. The other end of the crankshaft carries a generator, such as a flywheel magneto. Between the generator and the drive pulley, the crankshaft comprising webs to which the pistons are connected with connecting rods. Between the generator and the web closest to the generator, the crankshaft comprises a gear. The gear is used to drive a balancer shaft. The balancer shaft carries a balancer weight that offsets the effects of the webs of the crankshaft during rotation of the crankshaft. The balancer shaft also drives through a geared coupling a coolant pump. A centrifugal clutch also is positioned in line with the crankshaft.

This arrangement advantageously reduces crankshaft vibration through the use of the balancer shaft; however, the centrifugal clutch must be located in a position along the crankshaft axis that will provide ample space for the balancer shaft. As a result, the engine size must be increased in the vicinity of the crankshaft in order to accommodate the balancer shaft and the centrifugal clutch.

SUMMARY OF THE INVENTION

Accordingly, one aspect of the present invention involves an engine with an integrated continuously variable transmission. The continuously variable transmission connects a crankshaft of the engine and a transmission shaft. The continuously variable transmission comprises a driven pulley mounted to transmission shaft and a clutch mounted to the transmission shaft. A balancer shaft is connected to the crankshaft such that the balancer shaft rotates at the same speed as the crankshaft. The balancer shaft and the clutch overlap each other when viewed in a direction generally transverse to a rotational axis of the crankshaft.

BRIEF DESCRIPTION OF THE DRAWINGS

These and other features, aspects and advantages of the present invention will now be described with reference to the drawings of a preferred embodiment of the present invention, which embodiment is intended to illustrate and not to limit the invention, and in which figures.

DETAILED DESCRIPTION OF THE PREFERRED EMBODIMENT

Figure 1:
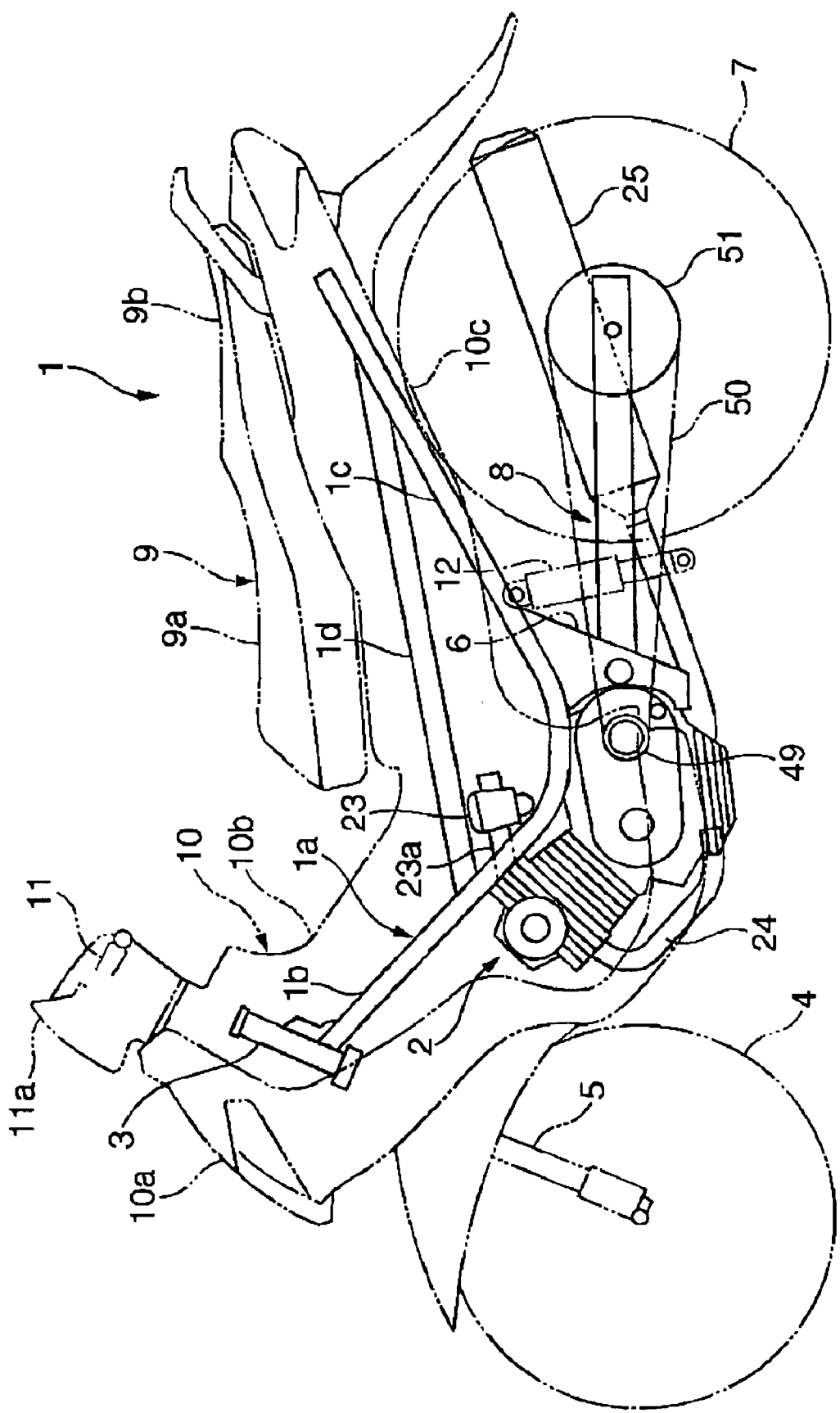
FIG. 1 is a left side view of a vehicle comprising an engine with an integrated CVT that has been arranged and configured in accordance with certain features, aspects and advantages of the present invention.

With respect to the illustrated embodiments, as used herein, front/forward, rear/rearward, left and right have been used in the following description with a frame of reference of a rider seated on the illustrated vehicle. Also, while multiple embodiments are shown in the figures, like reference numerals will be used to refer to like components from embodiment to embodiment and further description in later embodiments of components described with respect to earlier embodiments will be limited.

With reference now to FIG. 1, a motorcycle 1 is illustrated on which is mounted an engine and continuously variable transmission combination, which has been arranged and configured in accordance with certain features, aspects and advantages of the present invention. While the motorcycle 1 is one type of vehicle with which certain features, aspects and advantages of the present invention have particular utility, the present invention also can find utility with other vehicles in which a compact engine and transmission configuration would be desirably. For instance, certain features, aspects and advantages of the present invention may be useful with snowmobiles, small four wheeled and three wheeled vehicles, golf cars, personal watercraft, buggies, scooters, and the like.

With continued reference to FIG. 1, the motorcycle comprises a front fork 5. The front fork supports an axle of a front wheel 4. The front fork preferably is pivotally supported by a head pipe 3. The head pipe can be secured to a forward end of a vehicle frame 1a. When supported in this manner, the front fork 5 is capable of pivotal movement to the right and left.

A rear arm 8 preferably supports an axle of a rear wheel 7. The rear arm 8 can be pivotally supported by a rear arm bracket 6, which can be secured to a central or rearward portion of the frame 1a. Thus, the rear wheel 7 can swing in the up-and-down direction.

In the illustrated configuration, the motorcycle 1 also comprises a seat 9. The seat preferably has a saddle configuration. In the illustrated configuration, the seat 9 comprises a driver seat portion 9a and a tandem passenger seat portion 9b. Other configurations also can be used. The seat can be mounted on an upper portion of the vehicle frame 1a.

With continued reference to FIG. 1, the vehicle frame 1a preferably comprises right and left down tubes 1b that extend downwardly in a rearward direction from the head pipe 3. Right and left upper tubes 1*c* preferably extend upwardly in a rearward direction from the respective right and left down tubes 1*b*. In the illustrated configuration, right and left seat rails 1*d* are joined to the down tubes 1*b* and to the upper tubes 1*c*. The right and left seat rails 1*d* preferably extend generally horizontally but other configurations also The vehicle frame 1*a* preferably is covered with body panels 10. The body panels 10 can be formed of plastic, metal, carbon fiber or any other suitable matter. The body panels 10 can comprise, for example but without limitation, a front cover 10*a*, a leg shield 10*b*, and side covers 10*c*.

Handlebars 11, which can be covered with a steering bar cover 11*a*, are secured to the upper end of the illustrated front fork 5. The handlebars 11 can be used by operators of the vehicle to direct the vehicle along a desired course. A rear cushion, damper or shock absorber 12 can be used to control pivotal movement of the rear arm. In one configuration, the shock absorber 12 extends between the rear arm 8 and the rear arm bracket 6.

An engine unit 2 is mounted to the frame 1*a*. In the illustrated configuration, the engine unit 2 is mounted to the down tubes 1*b*. Any suitable engine mounted configuration can be used. The engine unit 2 preferably is mounted such that a drive shaft of the engine unit 2 is positioned rearward of a crankshaft of the engine unit 2 and such that the location about which the rear arm 8 pivots relative to the frame 1*a* is proximate the drive shaft of the engine unit 2.

Figure 2:
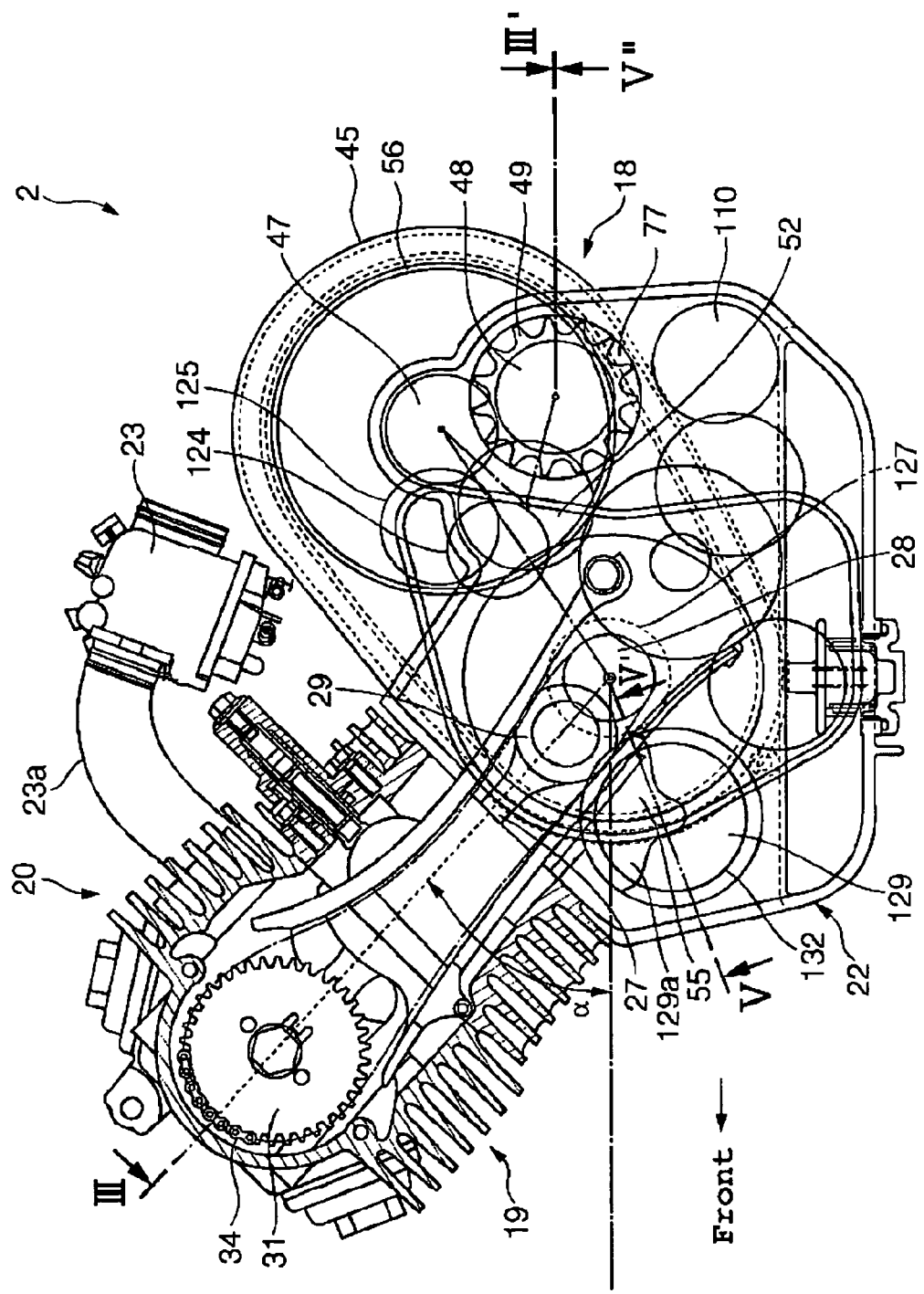
FIG. 2 is a simplified left side view, partially in cross section, of the engine/transmission combination of FIG. 1.
Figure 3:
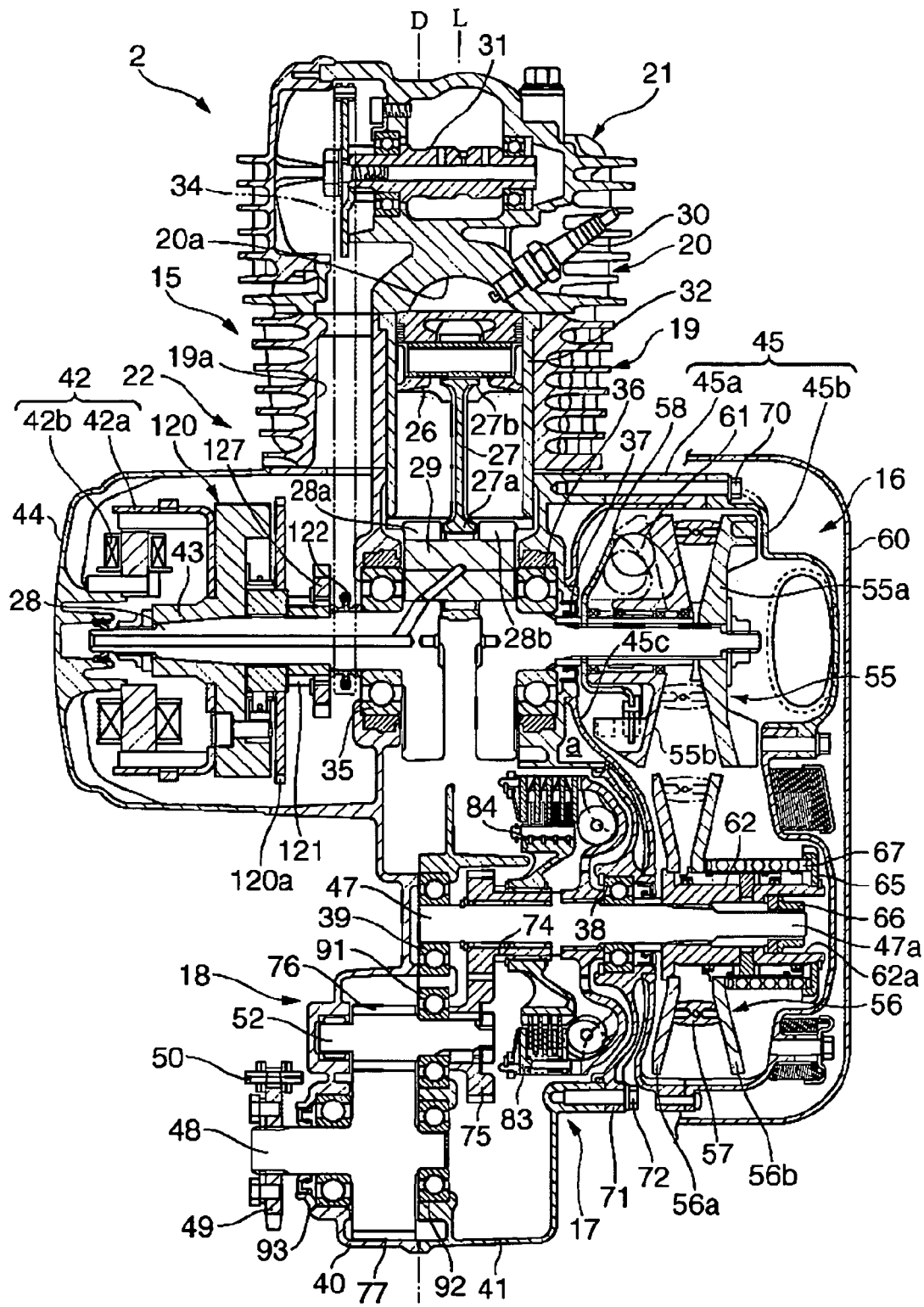
FIG. 3 is a sectioned view taken along the line III-III' in FIG. 2.
Figure 4:
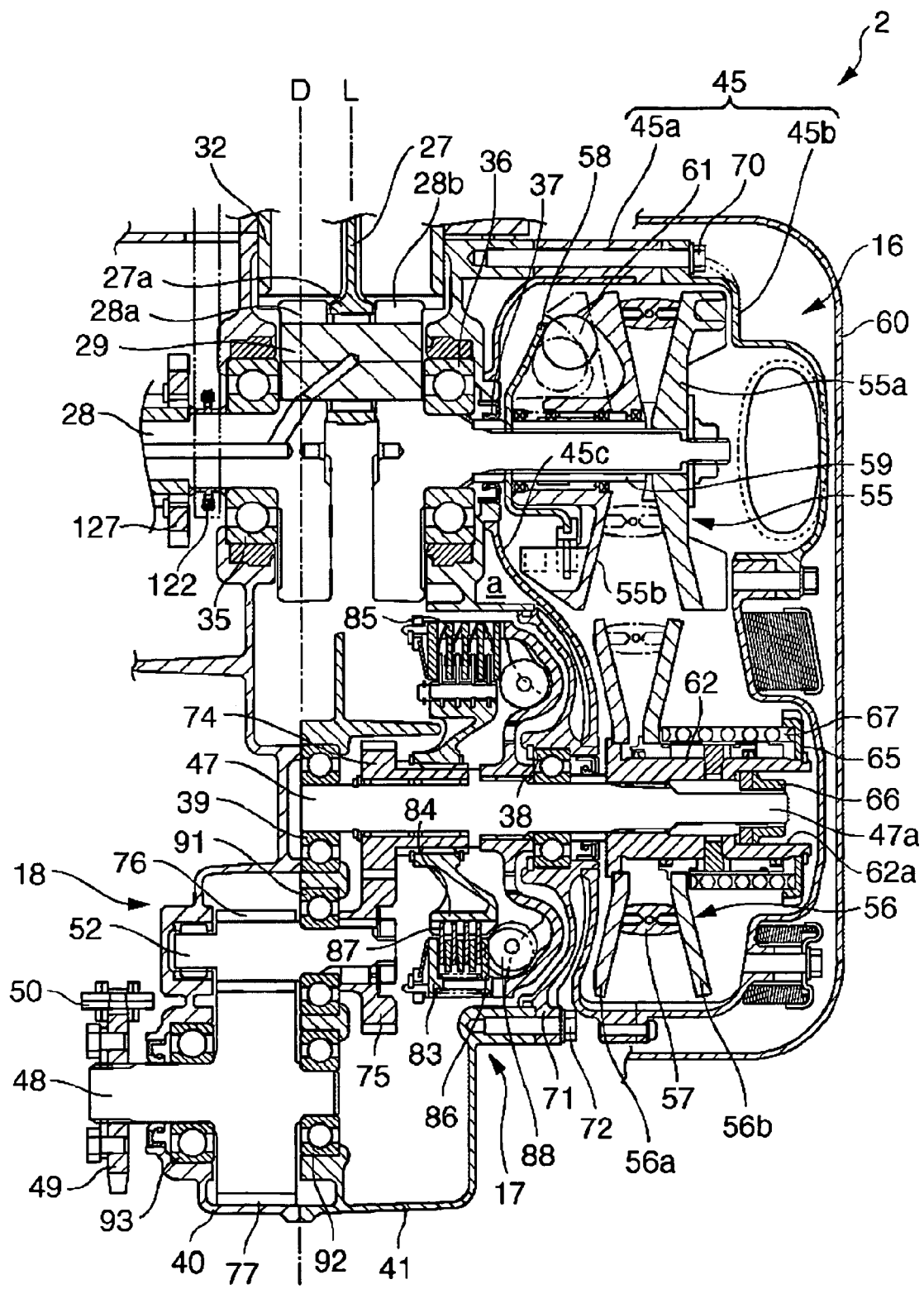
FIG. 4 is an enlarged sectioned view of a portion of the combination shown in FIG. 3.
Figure 5:
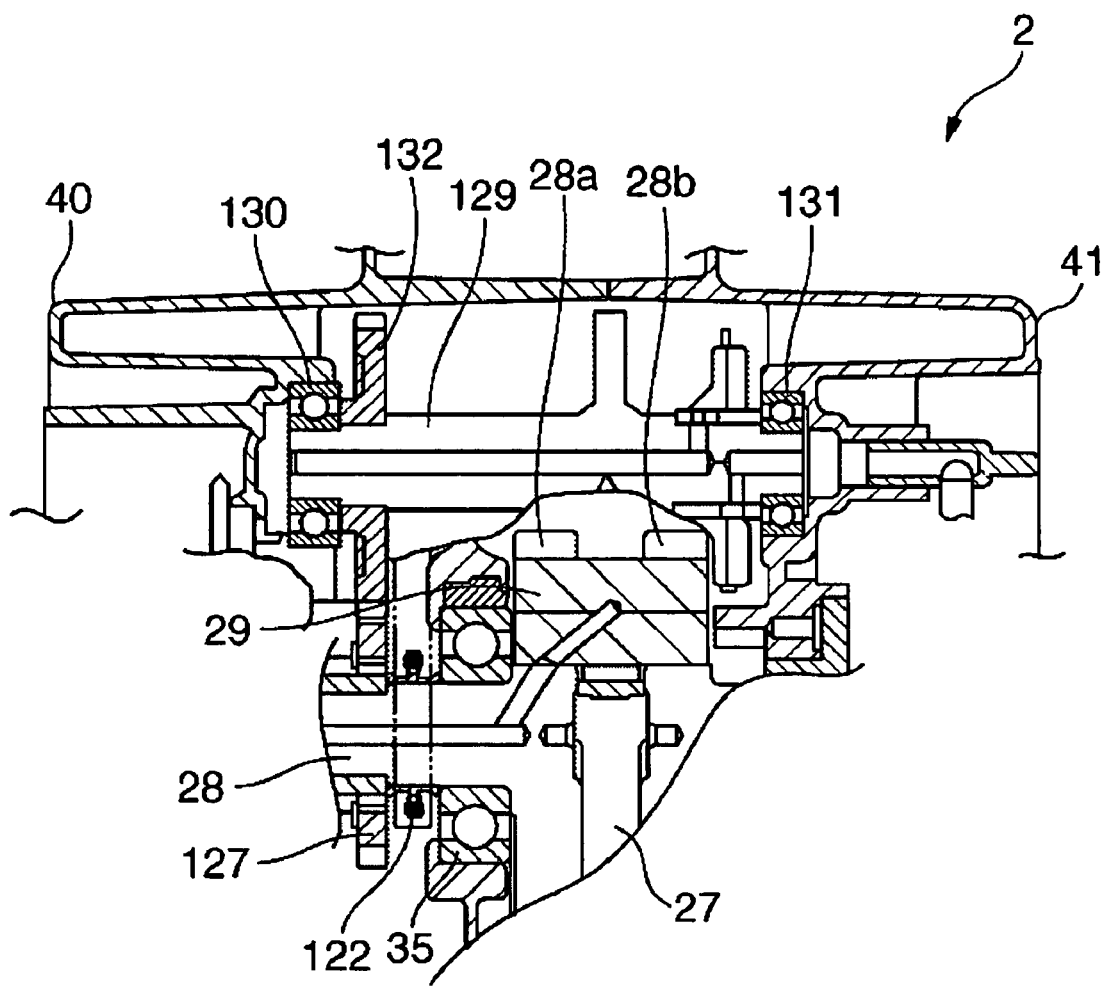
FIG. 5 is a partial sectioned view taken along the line V-V' in FIG. 2.

With reference now to FIGS. 1 to 3, the illustrated engine unit 2 comprises an air-cooled 4-cycle single cylinder engine 15 mounted with its cylinder axis A, which extends through a cylinder of a cylinder block 19, inclined at an angle of about 45 degrees (as indicated by the angle α). In other words, the cylinder (including the cylinder block 19, a cylinder head 20, and a head cover 21) can be inclined upward by the angle α of about 45 degrees relative to the horizontal; the forward tilt angle α however is not limited to this angle but preferably is in the range between about 33 to about 70 degrees. Other engine configurations also can be used.

The engine unit 2 also comprises a continuously variable transmission 16. In the illustrated configuration, the continuously variable transmission comprises a V-belt arrangement but other types of transmissions also can be used. The illustrated engine unit 2 also comprises a wet-type multi-plate centrifugal clutch mechanism 17 and a reduction gear mechanism 18.

As illustrated in FIG. 2, the engine 15 comprises the cylinder head 20 is connected to an upper surface of the illustrated cylinder block 19. The head cover 21 can be provided on the upper side of the cylinder head 20 and a crankcase 22 can be connected to the lower surface of the cylinder block 19. In the illustrated configuration, the crankcase 22 supports a crankshaft 28 and a transmission shaft 47.

An intake port (not shown) preferably extends through a rear surface of the cylinder head 20. The intake port (not shown) can communicate with a combustion chamber defined by a recess 20*a* formed in the cylinder head 20. A carburetor 23 can be connected to the intake port through an intake pipe 23*a*. In some configurations, the engine 15 can feature fuel injection (direct, indirect or both), either as an alternative to the carburetor or in combination with the carburetor.

An exhaust port (not shown) preferably extends through a front surface of the cylinder head 20. The exhaust port (not shown) can communicate with the recess 20*a* in the cylinder head. An exhaust pipe 24 can be connected to the exhaust port (not shown). The exhaust pipe 24 preferably extends generally rearward and downward of the engine 15. The illustrated exhaust pipe also extends toward and alongside the right side of the engine 15 in the illustrated configuration. Other configurations also can be used. The exhaust pipe 24 can be connected to a muffler 25, which is arranged on a right side of the rear wheel 7 in the illustrated configuration.

A spark plug 30 preferably is positioned within the recess 20*a*. The spark plug 30 can be used to ignite an air/fuel charge that is provided to the recess 20*a* through the intake port (not shown) or the like. Other configurations (e.g., glow plugs) also can be used.

In the illustrated arrangement, a chain chamber 19*a* extends along the left side portion of the cylinder block 19. The chain chamber 19*a* preferably passes through the crank case 22 and the cylinder head 20. A timing chain 34 can be positioned in the chain chamber 19*a* to drive a cam shaft 31 from rotation of a crankshaft 28. An intake valve (not shown) and an exhaust valve (not shown) can be opened and closed by the cam shaft 31. Other suitable configurations also can be used to open and close ports to the combustion chamber of the engine 15.

The cylinder block 19 defines a cylinder bore. The cylinder bore contains a piston 26. The piston translates within the cylinder bore. One or more cylinder bores and associated pistons 26 can be used. A small end 27*b* of a connecting rod 27 is coupled to the piston 26 and a large end 27*a* of the connecting rod 27 is coupled to a crank pin 29. The crank pin 29 preferably is inserted into a gap between, and coupled to, a first web 28*a* and a second web 28*b* of the crankshaft 28.

In the illustrated configuration, the crankcase 22 comprises a first case portion 40 and a second case portion 41. The two case portions 40, 41 each comprise a juncture D of corresponding mating surfaces that preferably extends generally parallel with a generally longitudinal plane L that extends through an axis of the cylinder block 19. The mating surfaces of the two case portions 40, 41 more preferably are offset in one direction from the generally longitudinal plane through the axis L. Even more preferably, the mating surfaces of the two case portions 40, 41 are offset to the left from the longitudinal plane that extends through the axis L. Further, the junction D can be positioned to the right side of a generally longitudinal plane S that extends along the outer diameter of the cylinder sleeve 32. That is, the juncture D preferably is positioned to the left side of the generally longitudinal plane L and to the right side of the generally longitudinal plate S. More preferably, the juncture D is positioned about half way between the plane L and the plane S. In this manner, the internal volume of the illustrated second case portion 41 is larger than the internal volume of the illustrated first case portion 40.

With continued reference to FIG. 2 and FIG. 3, the second case portion 41 comprises a removable case cover 71. The case cover 71 generally seals an opening 41*e* that is formed in the right side of the second case portion 41. The case cover 71 can be removably secured to the second case portion 41 with threaded fasteners 72, such as bolts or the like. When the case cover 71 is removed from the second case portion 41, the centrifugal clutch mechanism 17 can be removed from the chamber defined by the case cover 71, as can be the associated transmission shaft 47.

In the illustrated configuration, a generator case 44 can be provided on the front left side of the first case portion 40 to at least partially define a generator chamber. The generator case 44 preferably is removably attached to the first case portion 40 in the illustrated configuration. The generator case 44 preferably overlies a generator 42 that is positioned within the generator chamber. On the right side of the second case portion 41, a transmission case 45 can be connected to generally enclose the continuously variable transmission 16 within a transmission chamber defined, at least in part, by the transmission case 45. Either or both of the generator case 44 and the transmission case 45 can be integrally formed with the crankcase 22, but by making the cases 44, 45 removable in the illustrated configuration, the cases 44, 45 can be removed to improve serviceability of the underlying components.

As illustrated, the transmission case 45 preferably is formed independently of the crank case 22. The illustrated transmission case comprises a box-like case body 45a. The case body 45a preferably has an opening that is disposed outside of the second case portion 41. The transmission case 45 also comprises a closure 45b that substantially or completely closes the opening of the case body 45a. In one configuration, both the case body 45a and the closure 45b are secured to the second case portion 41 by bolts 70. Other techniques for attaching the case body 45a and the closure 45b, either separately or together, can be used.

In the illustrated configuration, a gap indicated by the reference letter "a" preferably is formed between a wall 45c of the case body 45a and the second case portion 41 to reduce the heat transfer into the transmission case 45 from the engine 15. A face cover 60 also can be provided that protects the transmission case 45 as well as that improves the aesthetics of the associated vehicle.

The crankshaft 28 preferably is positioned on the front side of the crankcase 22. As illustrated, the crankshaft 28 can be mounted using bearings. Preferably, on the left side of the plane L, the crankshaft 28 is journaled relative to the left end surface of the second case portion 41 by a bearing 35 and, and on the right side of the plane L, the crankshaft 28 is journaled relative to the right end surface of the second case portion 41 by another bearing 36.

In one configuration, the right end of the crankshaft 28 extends beyond the second case portion 41 into the transmission case 45. A drive pulley 55 of the continuously variable transmission 16 can be mounted to the right end of the crankshaft 28. In one advantageous configuration, a sealing member 37 can be provided in a portion where the crankshaft 28 extends beyond the right end surface of the second case portion 41 and the wall 45c of the transmission case 45. Preferably, in such a configuration, the transmission case 45 is hermetically closed with respect to the second case portion 41. By sealing the transmission case, the clutch mechanism enclosed in the second case portion 41 can include a wet multi-plate type of clutch.

Preferably, the left end of the crankshaft 28 extends beyond the first case portion 40 into the generator case 44. The generator 42 can be mounted on the left end of the crankshaft 28. In other words, the connecting rod 27 is connected to the crankshaft 28 between the generator 42 and the drive pulley 55 of the continuously variable transmission 16. In one configuration, the generator 42 comprises a rotor 42a that is secured to a sleeve 43 and the sleeve is taper-fit to the crankshaft 28. The generator also can comprise a stator 42b that facing the rotor 42a. The stator 42b can be secured to the generator case 44. Other configurations also can be used.

A transmission shaft 47 preferably is arranged in parallel with the crankshaft 28. In the illustrated configuration, the transmission shaft 47 is positioned on the rear side of the illustrated crankcase 22. The transmission shaft 47 can be supported by bearings 38, 39. Preferably, the transmission shaft 47 is journaled relative to the case cover 71 by the bearing 38. The bearing 38 is positioned on the right side of the plane L of the cylinder block 19. The bearing 39 preferably is positioned on the left side of the plane L. The bearing 39 journals the transmission shaft relative to the left end surface of the second case portion 41.

While the left end of the transmission shaft 47 can be supported by the first case portion 40 and the second case portion 41 can be interposed between the case cover 71 and the first case portion 40, but such a configuration reduces the support precision of the transmission shaft 47. The transmission shaft 47 may be worn out more rapidly and experience a decrease in durability and reliability as a result of this reduced precision. Thus, the illustrated configuration, which supports the left end of the transmission shaft 47 with the second case portion 41, improves the reliability and durability of the transmission 16. Moreover, the illustrated configuration maintains the serviceability of the clutch.

The right end of the transmission shaft 47 preferably extends into the transmission case 45 beyond the second case portion 41. A driven pulley 56 of the continuously variable transmission 16 can be attached to the right end of the transmission shaft 47. Preferably, the centrifugal clutch mechanism 17 also is mounted on the transmission shaft 47. While in the illustrated configuration, the drive pulley 55 is placed on the crankshaft 28 and the driven pulley 56 and the clutch mechanism 17 are placed on the transmission shaft 47, in some embodiments either the drive pulley 55 can be placed on the crankshaft 28 or the driven pulley 56 and the clutch mechanism 17 can be placed on the transmission shaft 47.

In the illustrated configuration, the centrifugal clutch mechanism 17 is positioned on one end portion of the transmission shaft 47 while the driven pulley 56 is positioned on the other end portion of the transmission shaft 47. Therefore, the illustrated centrifugal clutch mechanism 17 is arranged between the driven pulley 56 of the continuously variable transmission 16 and the plane L. The illustrated configuration is possible, in part, due to the juncture D of the crankcase 22 that is offset to the left side of the plane L of the cylinder block 19, which widens the space in the second case portion 41.

In the illustrated configuration, the centrifugal clutch mechanism 17 comprises the wet multi-plate type. Such a clutch mechanism 17 generally comprises spline-fitting a cup-shaped outer clutch mechanism 83 to the transmission shaft 47 such that the clutch mechanism 83 and the transmission shaft 47 will rotate together. Moreover, such a clutch mechanism also generally comprises generally concentrically arranging an inner clutch mechanism 84 on the inside of the outer clutch mechanism 83 in the axial direction. The inner clutch mechanism 84 preferably is spline-fit to a small primary reduction gear 74 that is secured on the transmission shaft 47 such that the transmission shaft 47 and the primary reduction gear 74 will rotate together.

A plurality of outer clutch plates 85 can be arranged in the outer clutch mechanism 83 and a pushing plate 86 can be arranged at the end of the outer clutch mechanism 83. The outer clutch plates 85 and the pushing plate 86 can engage the outer clutch mechanism 83 so as to rotate together with the outer clutch mechanism 83. Further, inner clutch plates 87 are arranged among the outer clutch plates 85 and the pushing plate 86. The inner clutch plates 87 are engaged with the outer periphery of the inner clutch mechanism 84 so as to rotate together with the inner clutch mechanism 84.

A cam surface 83a is formed on the inner side of the outer clutch mechanism 83 and a weight 88 is arranged between the cam surface 83a and the pushing plate 86. The weight 88 moves outward in the radial direction along the cam surface 83a due to centrifugal forces created on the weight 88, i.e., the weight 88 moves in a direction in which the clutch mechanism is connected, whereby the pushing plate 86 are moved in a manner that results in the outer clutch plates 85 and the inner clutch plates 87 being squeezed together. In the figures, the upper weight 88 is shown in a disengaged position while the lower weight 88 is shown in an engaged position.

The continuously variable transmission 16 generally comprises the drive pulley 55, which is mounted on the right end of the crankshaft 28 in the illustrated embodiment, the driven pulley 56, which is mounted on the right end of the transmission shaft 47 in the illustrated embodiment, and the V-belt 57 that is wrapped round the drive pulley 55 and the driven pulley 56. While the illustrated configuration uses a V-belt, other flexible transmitters also can be used, such as but not limited to, steels belts, segmented belts, rubber belts, cables, rings, loops and the like.

The illustrated continuously variable transmission 16 will now be described. The drive pulley 55 preferably comprises a drive side fixed sheave 55a and a drive side moveable sheave 55b. The drive side fixed sheave 55a is secured to the right end of the crankshaft 28. A slide collar 59 rotationally secures the drive side moveable sheave 55b to the crankshaft 28 while allowing the moveable sheave 55b to slide axially along the crankshaft. A cam plate 58 is arranged on the left side of the drive side moveable sheave 55b and a suitably shaped weight 61 is arranged between the cam plate 58 and the drive side moveable sheave 55b. In the illustrated configuration, the weight 61 is generally cylindrically shaped.

The driven pulley 56 preferably includes a driven side moveable sheave 56b and a driven side fixed sheave 56a. The moveable sheave 56b is biased by a coil spring 67 and can translate along the transmission shaft 47. Preferably, the moveable sheave 56b is mounted on the right end of the transmission shaft 47 and is secured to the transmission shaft 47 so that the moveable sheave 56b will rotate together with the transmission shaft 47. The driven side fixed sheave 56a can be secured to the transmission shaft 47 in any suitable manner. A collar 62 is used to secure the fixed sheave 56a in the illustrated configuration. The collar 62 can be secured to the fixed sheave 56a and can be spline-fit to the transmission shaft 47. The illustrated collar 62 has a generally cylindrical shape. In the illustrated configuration, the drive side fixed sheave 56a is interposed between the drive side moveable sheave 56b and the centrifugal clutch 17.

As the rotational speed of the crankshaft 28 increases, the weight 61 of the drive pulley 55 in the continuously variable transmission 16 moves radially outward due to the centrifugal force of the weight 61. The movement of the weight 61 causes the drive side moveable sheave 55b to move in the axial direction toward the fixed sheave 55a. Due to this movement, the V-belt wrapping diameter of the drive pulley 55 increases. Therefore, the driven side moveable sheave 56b moves in the axial direction away from the fixed sheave 56a, which compresses the coil spring 67. The axial movement of the moveable sheave 56b causes the wrapping diameter of the driven pulley 56 to decrease. Hence, the reduction ratio decreases as the speed of the crankshaft 28 increases. As the rotational speed of the crankshaft 28 decreases, the weight 61 moves radially inward which allows the drive side moveable sheave 55b to move axially away from the fixed sheave 55a. Therefore, the driven side moveable sheave 56b moves axially toward the fixed sheave 56a under the biasing force of the coil spring 67. Hence, the wrapping diameter of the driven pulley 56 increases, the wrapping diameter of the drive pulley 55 decreases and, as a result, the reduction ratio increases as the speed of the crankshaft 28 decreases.

As illustrated, the driven pulley 56 can be secured to the transmission shaft 47 by a lock nut 66. The lock nut 66 can be screwed onto the end of the transmission shaft 47. The lock nut 66 preferably is submerged in the right end 62a of the collar 62. Accordingly, the inner diameter of the collar 62 preferably comprises an enlarged portion that is larger than the outer diameter of the transmission shaft 47. More preferably, a right end 47a of the illustrated transmission shaft 47 has a stepped configuration featuring a diameter which is decreased relative to the main portion of the transmission shaft 47. Such a constitution enables the lock nut 66 to be easily inserted in the right end 62a of the collar 62.

As illustrated, the coil spring 67 seats on a spring-receiving member 65. Due to the nut 66 being received within the collar 62, the overall length associated with the transmission shaft 47 can be decreased and the collar 62 and nut 66 need not extend an excessive distance outward of the driven pulley 56. Thus, in the illustrated configuration, the components associated with the driven pulley 56 extend outward only a sufficient distance to provide sufficient space to accommodate the spring 67.

With reference now again to FIG. 3, the engine will be described in more detail. As shown, a first drive gear 121 can be positioned on the crankshaft 28 between the bearing 35 and the generator 42. Preferably, the first drive gear 121 is press-fit to the crankshaft 28. A second drive gear 127 preferably is provided between the bearing 35 and the first gear 121. More preferably, the first and second drive gears 127 rotate together. The second drive gear 127 preferably meshes with a balancer gear 132 provided on one end of a balancer shaft 129. Thus, the rotation of the crankshaft 28 can be transmitted from the first drive gear 121 through the second drive gear 127 to the balancer gear 132 in the illustrated configuration. A one-way clutch 120 can be provided between the first drive gear 121 and the sleeve 43 of the generator 42. The one-way clutch 120 can comprise a starting gear 120a that is connected through an idler gear 124 to the drive gear of a starter motor 125. While the illustrated embodiment is arranged such that the starting gear 120a is connected to a drive gear 125a of the starter motor 125 through the single idler gear 124, the starting gear 120a also may be connected to the drive gear 125a of the starter motor 125 through two or more idler gears as desired.

A cam sprocket 122 connects the timing chain 34 to the crankshaft 28. Preferably, the cam sprocket 122 is interposed between the bearing 35 and the second drive gear 127. Other configurations also can be used.

The balancer shaft 129 preferably extends generally parallel to the crankshaft 18. More preferably, the balancer shaft 129 is positioned forward of the crankshaft 28. A bearing 131 can secure the right end of the balancer shaft 129 to the second case portion 41 while another bearing 130 can secure the left end of the balancer shaft 129 to the first case portion 40.

The balancer gear 132, which meshes with the drive gear 33, can be positioned generally adjacent to the right side of the bearing 130. Because the balancer shaft 129 is placed in front of the crankshaft 28 in the illustrated configuration, the space behind the crankshaft 28 (i.e., the space previously used for the balancer shaft 129) may be used to increase the forward tilt angle of the cylinder block 19, the cylinder head 20, and the head cover 21 relative to horizontal (e.g., these components are inclined to about 45 degrees in the illustrated embodiment).

Figure 6:
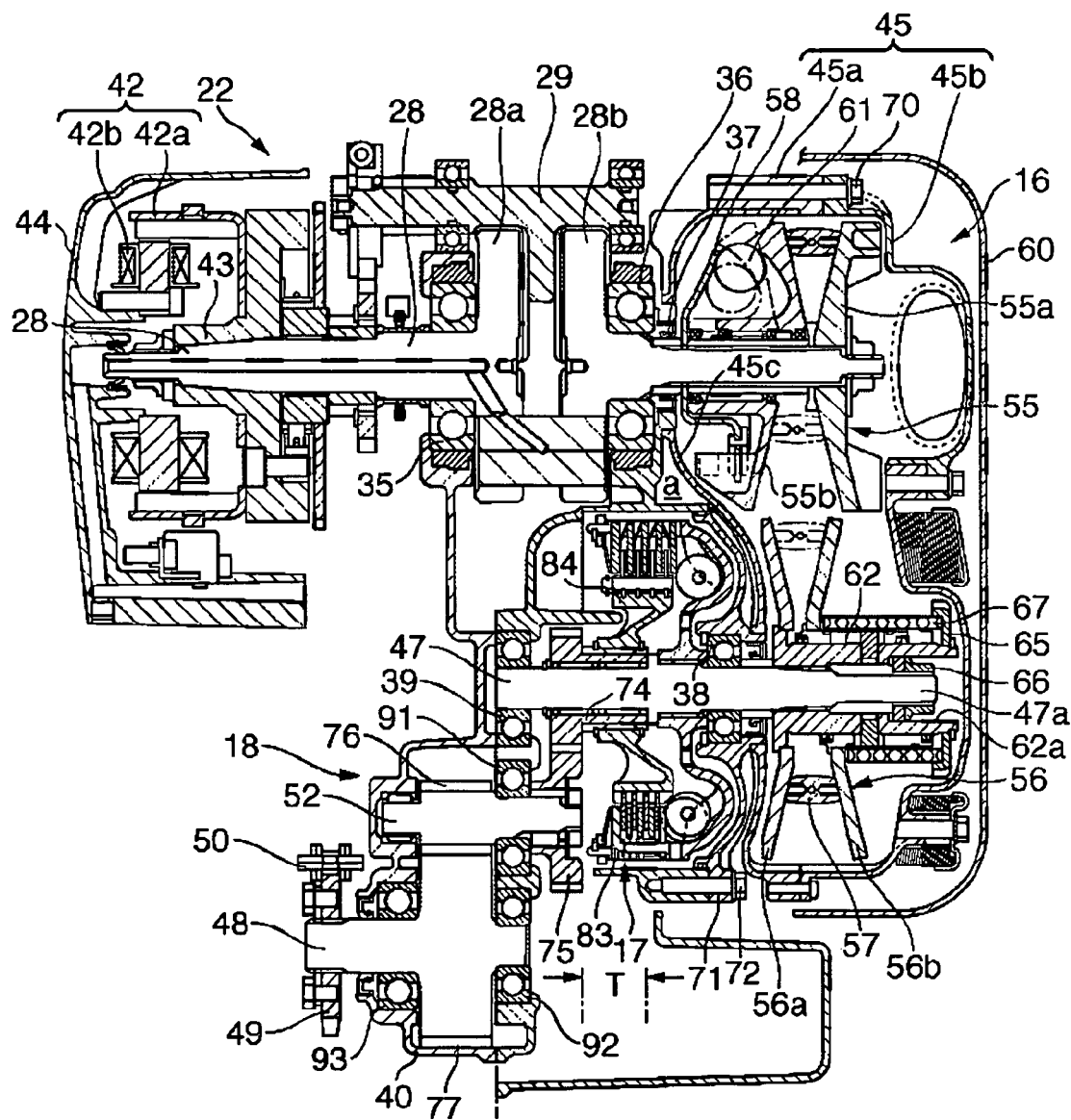
FIG. 6 is a partial sectioned view taken along the line V-V'-V" in FIG. 2.

With reference to FIG. 6, which is a view taken along the line V-V'-V" in FIG. 2, because the centrifugal clutch 17 is provided on the transmission shaft 47 and because the balancer shaft 129 is placed on the opposite side of the transmission shaft 47 with respect to the crankshaft 28, the balancer shaft 129 and the centrifugal clutch 17 can overlap each other by a dimension T along the axis of the crankshaft 28. Such a configuration allows the lateral width of the engine to be decreased.

With reference to FIG. 2, the starter motor 125 can be positioned to the rear of the crankshaft 28, which is the same side of the crankshaft to which the transmission shaft 47 is positioned in the illustrated configuration. The end of the drive gear (not shown) (or the end of a main shaft) can extend generally parallel to the crankshaft 28 inboard of the starter motor 125. The starter motor 125, therefore, can be positioned within the profile of the transmission case 45 (see FIG. 2). Because the starter motor 125 is positioned relative high on the vehicle body, even if water or the like splashes up from the ground surface during operation, for example, the likelihood of the water contacting the starter motor 125 is greatly reduced.

In the illustrated configuration, the reduction gear train 18 comprises a reduction shaft (idler shaft) 52 that extends generally parallel to the transmission shaft 47. A primary reduction large gear 75 is mounted to the reduction shaft. The primary reduction large gear 75 meshes with a primary reduction small gear 74. The primary reduction small gear 74 is mounted to the transmission shaft 47. The reduction shaft 52 can be integrally formed with a secondary reduction small gear 76 or can be separately formed and secured thereto. A drive shaft 48 can be integrally formed with a secondary reduction large gear 77 or the secondary reduction large gear 77 can be separately formed and secured to the drive shaft 48 in any suitable manner. The secondary reduction large gear preferably meshes with the secondary reduction small gear 76. In some configurations, however, the secondary reduction large gear 77 provided on the drive shaft 48 can engage with the primary reduction small gear 74 without using the reduction shaft 52 and the primary reduction large gear 75.

In the illustrated configuration, a bearing 91 can secure the right end portion of the reduction shaft 52 to the left end face of the second case portion 41. The left end portion of the reduction shaft 52 can be rotatably secured to the left end face of the first case portion 40.

The drive shaft 48 preferably extends generally parallel to the reduction shaft 52. In other words, the drive shaft 48 can comprise a rotary shaft other than the transmission shaft 47. A bearing 92 can be used to secure the right end of the drive shaft 48 to the left end face of the second case portion 41. Another bearing 93 can be used to secure the left end portion of the drive shaft 48 to the left end face of the first case portion 40. The left end of the drive shaft 48 can be provided with a sprocket 49. The sprocket 49 can be connected by a chain 50 to a driven sprocket 51 associated with the rear wheel 7. A kick shaft 110 also can be provided below and generally parallel to the drive shaft 48.

Figure 7:
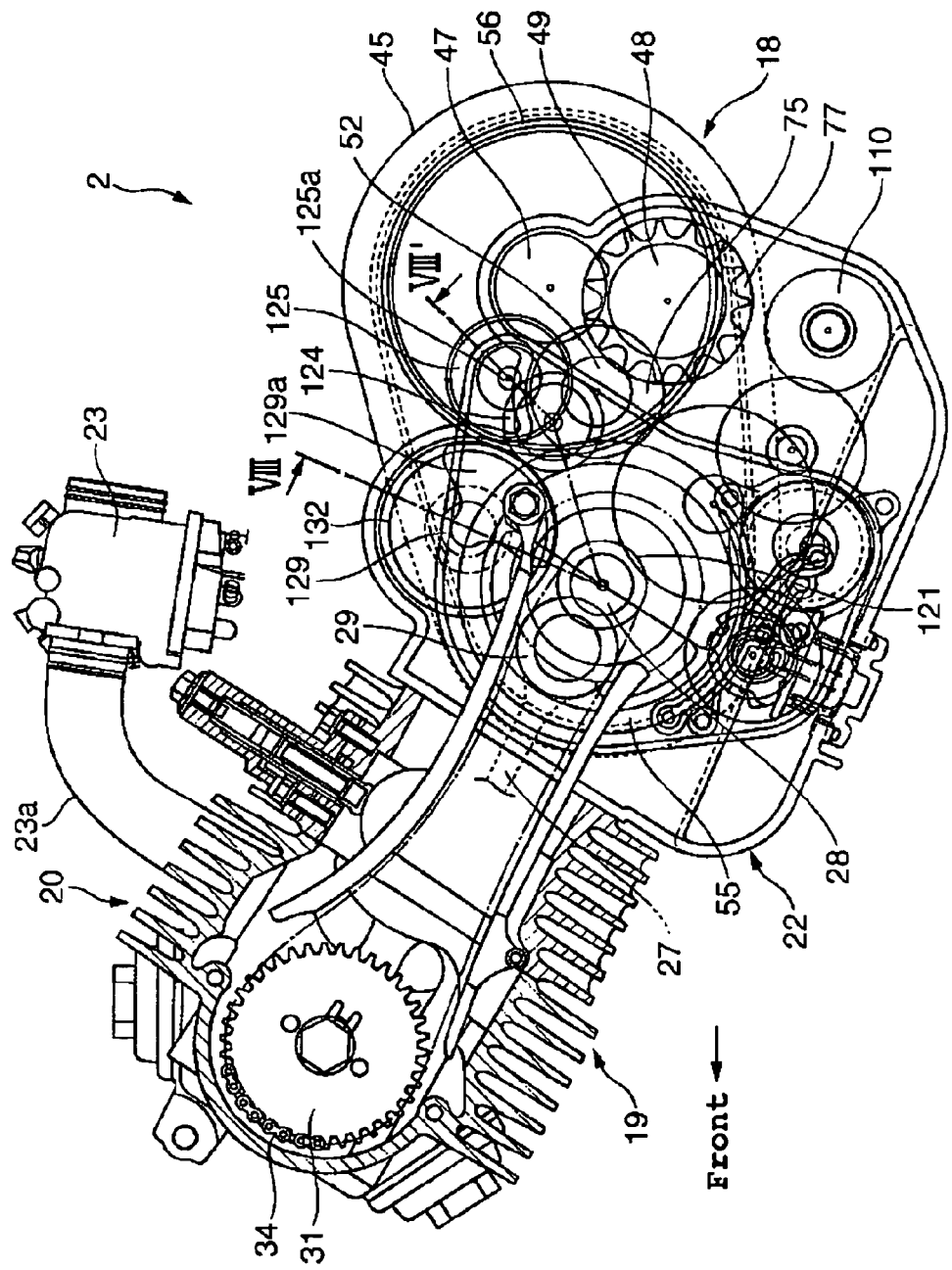
FIG. 7 is a perspective view of a second embodiment that is arranged and configured in accordance with certain features, aspects and advantages of the present invention.

With reference now to FIG. 7, a second embodiment is shown therein that is arranged and configured in accordance with certain features, aspects and advantages of the present invention. The engine illustrated in FIG. 7 has been reconfigured to provide a cylinder axis that extends in a generally horizontal direction.

As illustrated, in this configuration, the balancer shaft 129 preferably extends generally parallel to the crankshaft 18 and is positioned generally above and to the rear of the crankshaft 28. The bearing 131 can secure the right end portion of the balancer shaft 129 to the second case portion 41. The bearing 130 can secure part of the balancer shaft 129 close to its left end portion to the first case portion 40. The left end portion of the balancer shaft 129 preferably extends out of the first case portion 40 and the balancer gear 132 can be mounted to this portion of the balancer shaft 129.

Figure 8:
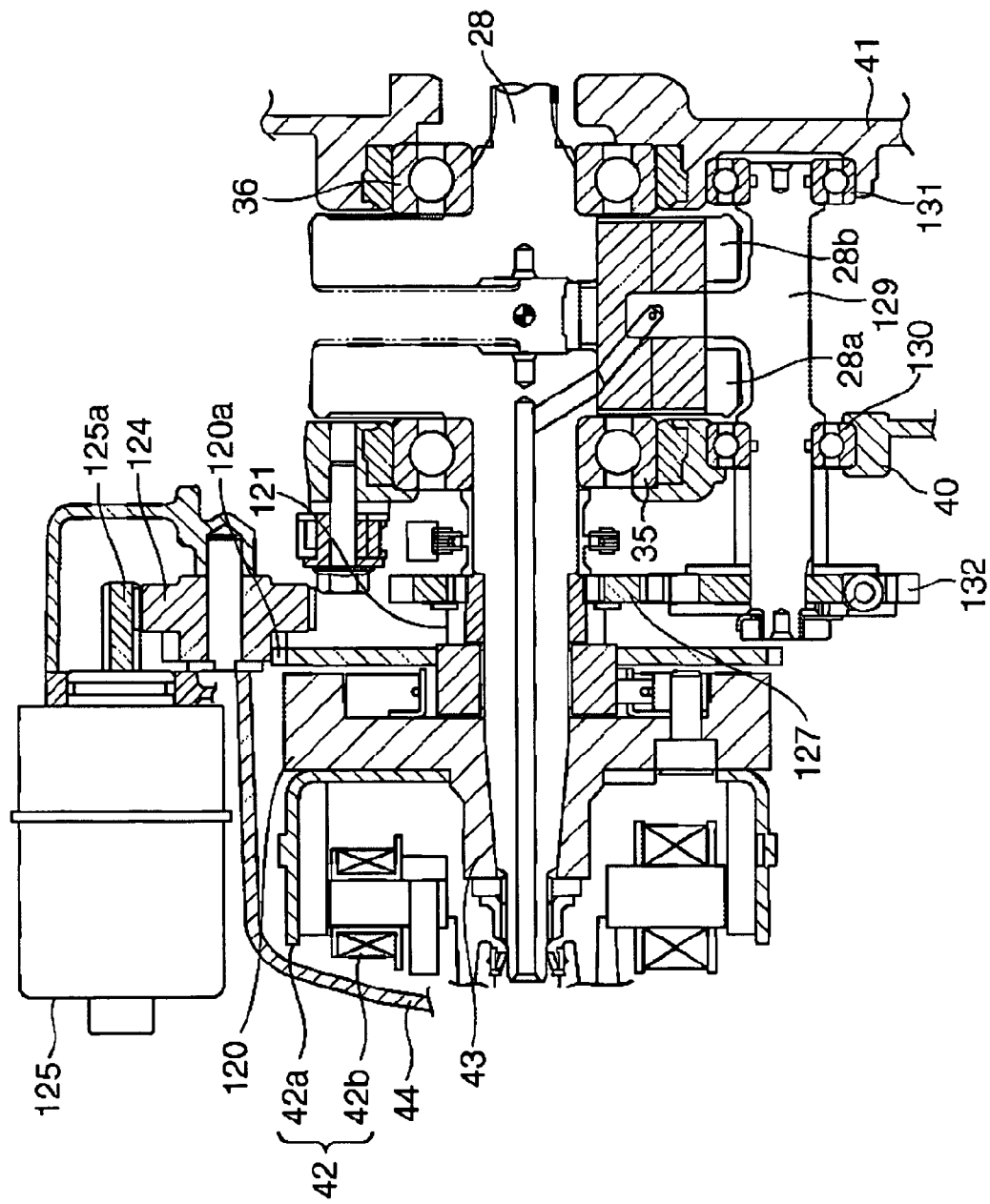
FIG. 8 is a partial sectioned view taken along the line VIII-VIII' in FIG. 7.

With reference to FIG. 8, the left and right webs 28a and 28b of the crankshaft 28 can be interposed between the bearings 130 and 131. A balancer weight 129a of the balancer shaft 129 preferably can pass between the webs 28a, 28b and, more preferably can pass through a region close to the crankshaft 28 such that it will overlap with the rotation locus of the crankpin 29. Thus, the balancer shaft 129 can be compactly assembled relative to the crankshaft 28. In addition, the balancer shaft 129 preferably is positioned within the profile (i.e., the contours) of the transmission case 45 as seen in side view.

With reference again to FIG. 7, the starter motor 125 advantageously is placed closer to the transmission shaft 47 than the balancer shaft 129. Preferably, the starter motor 125 is placed on the transmission shaft 47 side of the crankshaft 28 generally along a plane that connects the crankshaft 28 and the transmission shaft 47. In the illustrated configuration, the starter motor 125 is intersected by that plane but not bisected by that plane. Also, the starter motor 125 preferably is placed on the crankshaft 28 side of the transmission shaft 47 generally along a plane that connects the crankshaft 28 and the transmission shaft 47. The end of the drive gear 125a (or the end of the main shaft) can be positioned generally parallel to the crankshaft 28 and inboard of the starter motor 125. In addition, the starter motor 125 can be positioned within the profile of the transmission case 45 as seen in side view of the vehicle body (see FIG. 2).

Figure 9:
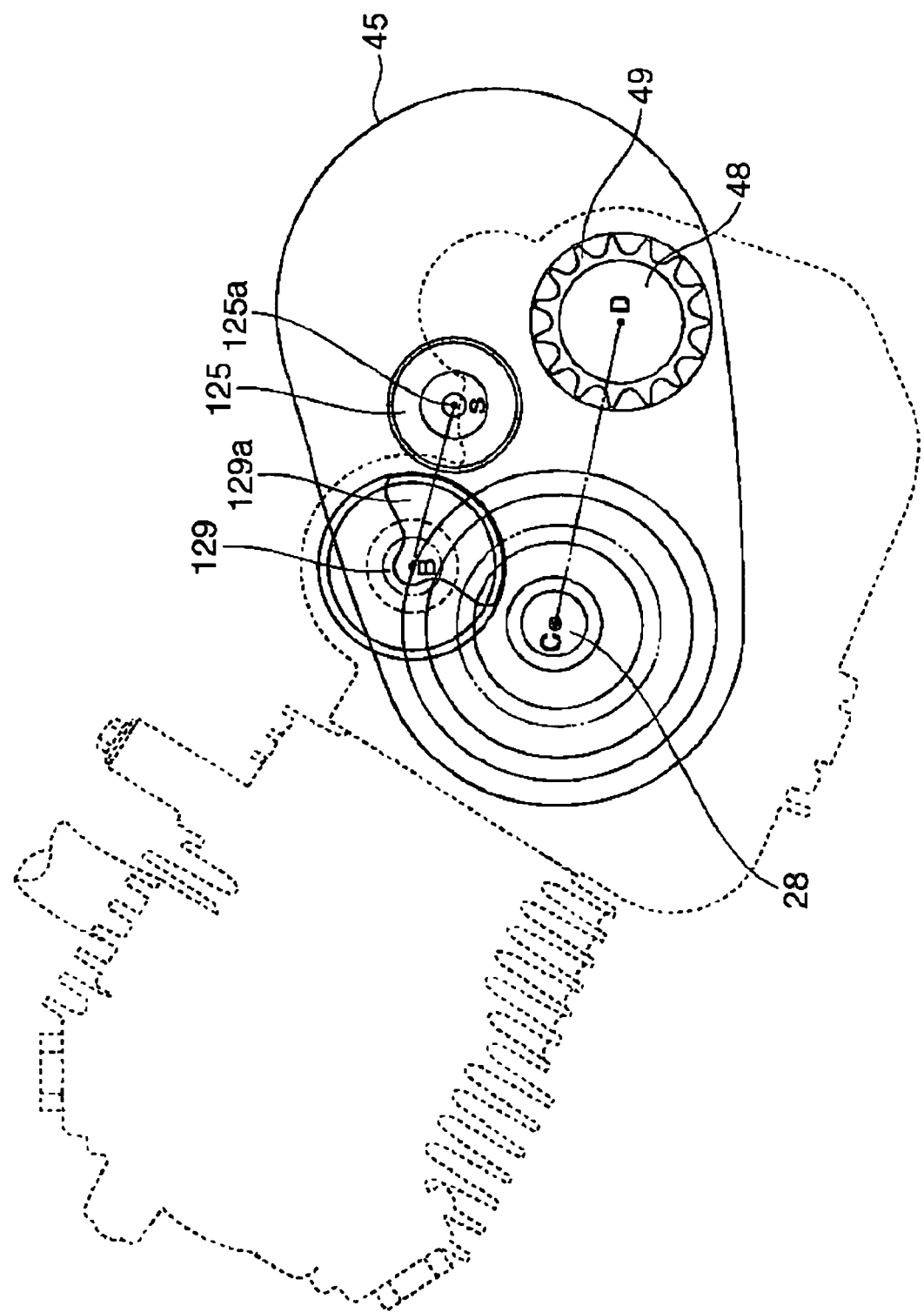
FIG. 9 is a view mainly showing a starter motor, a crankshaft, a balancer shaft, and a drive shaft of the engine/transmission combination shown in FIG. 7.

With reference now to FIG. 9, the engine 15 preferably is arranged such a plane connecting the axis D of the drive shaft 48 and the axis C of the crankshaft 28 extends generally parallel to the plane that interconnects the axis B of the balancer shaft 129 and the axis S of the starter motor 125. Thus, because the starter motor 125 does not interfere with the carburetor 23, as shown in FIG. 7, the carburetor 23 need not be placed along the upper portion of the vehicle body. Therefore, it is possible to place the intake system in the lower portion of the vehicle body and use the space normally used by the intake system for other components. For instance, the space may be used to provide a storage section for a helmet or the like.

Although the present invention has been described in terms of a certain embodiment, other embodiments apparent to those of ordinary skill in the art also are within the scope of this invention. Thus, various changes and modifications may be made without departing from the spirit and scope of the invention. For instance, various components may be repositioned as desired. Moreover, not all of the features, aspects and advantages are necessarily required to practice the present invention. Accordingly, the scope of the present invention is intended to be defined only by the claims that follow.

What is claimed is:

1. An engine with an integrated continuously variable transmission, the continuously variable transmission connecting a crankshaft of the engine and a transmission shaft, the continuously variable transmission comprising a driven pulley mounted to the transmission shaft and a clutch mounted to the transmission shaft, a balancer shaft being connected to the crankshaft such that the balancer shaft rotates at the same speed as the crankshaft, the balancer shaft and the clutch overlapping each other when viewed in a direction generally transverse to a rotational axis of the crankshaft.

2. The combination of claim 1, wherein the balancer shaft is positioned between the crankshaft and the transmission shaft.

3. The combination of claim 1, wherein a drive pulley is mounted on the crankshaft.

4. The combination of claim 3, wherein a connecting rod is positioned along the crankshaft between the drive pulley and a cam drive system.

5. The combination of claim 1, wherein a drive pulley is disposed on the crankshaft, and the balancer shaft is positioned between the crankshaft and the transmission shaft.

6. The combination of claim 5, wherein a connecting rod is positioned along the crankshaft between the drive pulley and a cam drive system.

7. The combination of claim 1, wherein the driven pulley and the clutch are disposed on the transmission shaft.

8. The combination of claim 7, wherein a connecting rod is positioned along the crankshaft between the drive pulley and a cam drive system.

9. The combination of claim 8, wherein a balancer shaft drive portion is positioned between the connecting rod and the cam drive system.

10. The combination of claim 8, wherein a bearing for supporting the crankshaft is interposed between the drive pulley and the cam drive system.

11. The combination of claim 10, wherein a balancer shaft drive portion is positioned between the connecting rod and the cam drive system.

12. The combination of claim 11, wherein the starter motor and the balancer shaft are disposed within a profile of a belt chamber of the continuously variable transmission as seen in side view of a vehicle body.

13. The combination of claim 11, wherein the starter motor is disposed such that a main shaft of the starter motor extends generally parallel to the crankshaft and such that the power takeout portion of the starter motor is located between the starter motor and a connecting rod of the engine.

14. The combination of claim 11, wherein a plane connecting a rotational axis of the starter motor and a rotational axis of the balancer shaft is generally parallel to a plane connecting the rotational axis of the crankshaft and a rotational axis of the drive shaft when viewed along the rotational axis of the crankshaft.

15. The combination of claim 11, wherein the starter motor is disposed on the crankshaft side of the transmission shaft.

16. The combination of claim 1, wherein a cylinder for accommodating the piston is tilted from a horizontal plane toward a vertical direction by an angle within a range of 33 to 70 degrees.

17. The combination of claim 1, wherein a starter motor is disposed closer to the transmission shaft than the crankshaft along a plane connecting the rotational axis of the crankshaft and a rotational axis of the transmission shaft.

18. The combination of claim 1, wherein a starter motor is disposed closer to the transmission shaft than the balancer shaft, the balancer shaft being positioned generally between the transmission shaft and the crankshaft.

19. The combination of claim 1 in combination with a straddle-type vehicle.

20. The combination of claim 1, wherein the balancer shaft is positioned generally forward of the crankshaft such that the crankshaft is positioned generally between the balancer shaft and the transmission shaft.

* * * * *